US006745413B2

(12) United States Patent
Pinciaro

(10) Patent No.: US 6,745,413 B2
(45) Date of Patent: Jun. 8, 2004

(54) HYDROTHERAPY JET SYSTEM HAVING FLUID LINE QUICK CONNECTOR ADAPTED FOR MULTIPLE SIZES OF JET FIXTURE BODIES AND OTHER PLUMBING FITTINGS

(75) Inventor: John Pinciaro, Woodbridge, CT (US)

(73) Assignee: Precision Design Concepts, LLC, Woodbridge, CT (US)

( * ) Notice: Subject to any disclaimer, the term of this patent is extended or adjusted under 35 U.S.C. 154(b) by 0 days.

(21) Appl. No.: 10/214,514

(22) Filed: Aug. 8, 2002

(65) Prior Publication Data

US 2004/0025245 A1 Feb. 12, 2004

(51) Int. Cl.[7] ............................................. A61H 33/04
(52) U.S. Cl. ..................... 4/541.6; 4/541.4; 4/541.5; 285/921
(58) Field of Search ..................... 4/541.1, 541.3, 4/541.4, 541.5, 541.6; 239/428.5; 285/921, 12

(56) References Cited

U.S. PATENT DOCUMENTS

| | | | |
|---|---|---|---|
| 4,420,846 A | 12/1983 | Bonner | 4/542 |
| 4,542,853 A * | 9/1985 | Diamond | 239/383 |
| 4,592,100 A | 6/1986 | Robertson et al. | 4/492 |
| 4,671,463 A * | 6/1987 | Moreland et al. | 239/428.5 |
| 4,689,839 A * | 9/1987 | Henkin et al. | 4/541.4 |
| 4,731,887 A | 3/1988 | Henkin et al. | 4/541 |
| 4,858,255 A | 8/1989 | Haisman | 4/544 |
| 4,875,714 A * | 10/1989 | Lee | 285/86 |
| 4,982,459 A | 1/1991 | Henkin et al. | 4/541 |
| 5,058,220 A | 10/1991 | Mikiya | 4/542 |
| 5,245,714 A | 9/1993 | Haraga et al. | 4/542 |
| 5,335,376 A | 8/1994 | Kaldewei | 4/541.6 |
| 5,353,447 A * | 10/1994 | Gravatt | 4/541.6 |
| 5,453,579 A | 9/1995 | Cohea | 174/153 |
| 5,495,627 A * | 3/1996 | Leaverton et al. | 4/541.6 |
| 5,573,279 A * | 11/1996 | Rea et al. | 285/21.1 |
| 5,806,139 A | 9/1998 | Anderson et al. | 16/2.1 |
| 5,848,444 A * | 12/1998 | Christopherson | 4/541.6 |
| 5,850,640 A | 12/1998 | Pinciaro | 4/541.6 |
| 5,920,924 A * | 7/1999 | Pinciaro | 4/541.6 |
| 6,088,874 A | 7/2000 | Nakata et al. | 16/2.1 |
| 6,094,754 A | 8/2000 | Pinciaro | 4/541.6 |
| 6,141,804 A | 11/2000 | Pinciaro | 4/541.6 |
| 6,334,224 B1 * | 1/2002 | Chalberg et al. | 4/541.6 |

* cited by examiner

Primary Examiner—Henry Bennett
Assistant Examiner—Amanda Flynn

(57) ABSTRACT

A hydrotherapy jet system includes a fixture body, an air line connector coupled to the fixture body, and a water line connector coupled to the air line connector. The air line connector is provided with structure adapted to couple about the outside of relatively small fixture bodies and about the inside of relatively large fixture bodies. As such, the air line connector is universal for multiple sizes of fixture bodies. The water line connector is coupled to the rear of the air line connector. The air and water line connectors may be rotated relative to the element to which each is coupled to facilitate assembly and plumbing. Other plumbing components and fittings may be coupled in a manner which provides a fluidtight seal and permits the components and fitting to thereafter be rotated relative to each other.

20 Claims, 9 Drawing Sheets

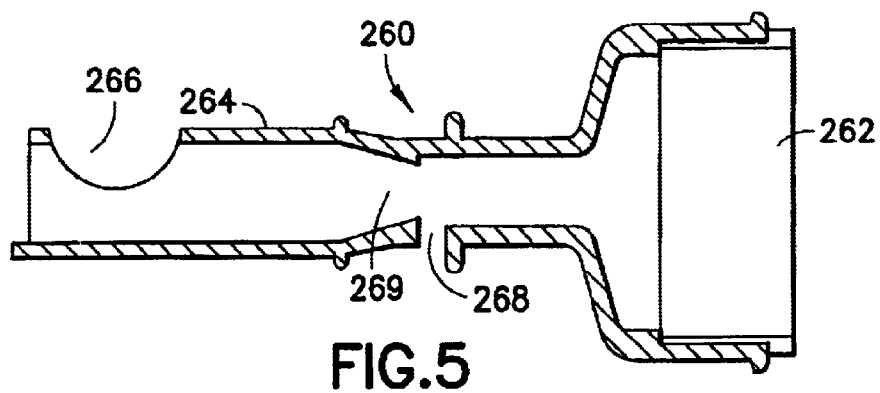
FIG.5
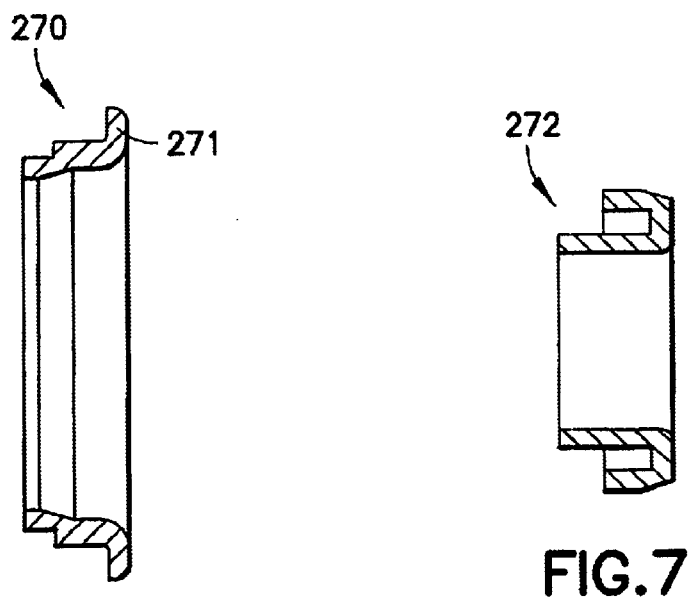
FIG.6
FIG.7
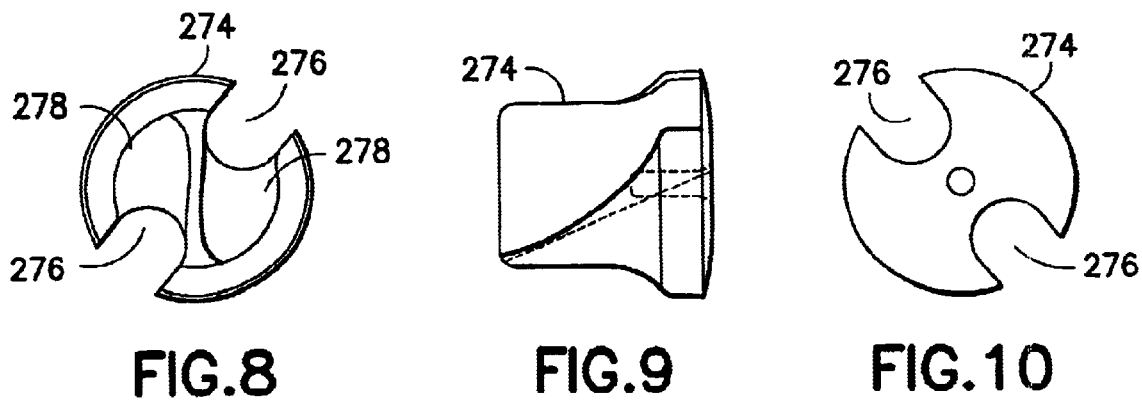
FIG.8　　FIG.9　　FIG.10

HYDROTHERAPY JET SYSTEM HAVING FLUID LINE QUICK CONNECTOR ADAPTED FOR MULTIPLE SIZES OF JET FIXTURE BODIES AND OTHER PLUMBING FITTINGS

BACKGROUND OF THE INVENTION

1. Field of the Invention

This invention relates broadly to hydrotherapy spas, tubs and pools. More particularly, this invention relates to plumbing components of hydrotherapy spa jet systems that are adapted to be easily and quickly installed in a tub or pool.

2. State of the Art

Hot tubs and spas are generally relatively deep tubs formed by rotational molding, blow-molding or vacuum-forming. The tubs are provided with a number of fixtures including water jet assemblies. The appeal of hot tubs and spas is primarily due to the hydrotherapy provided by pressurized water jet assemblies recessed into the tub wall which provide a massaging action.

In particular, each hydrotherapy jet assembly is connected typically via flexible conduits to water and air manifolds which supply pressurized water and air to each jet assembly of the spa tub. The pressurized water flows through a hydrotherapy jet assembly having an expanded throat, i.e., a venturi. As the water flows through the expanded throat, the water at the center of the throat moves more rapidly than the water along the sides of the nozzle. As a result, a low pressure area is created at the center of the throat. Air is drawn from an inlet into the low pressure area and mixes with the water. The mixture of pressurized water and air thereby provide an aerated therapeutic jet of water.

Hydrotherapy jet fixtures are generally installed in a hole in the tub wall, with the fixture outlet directed into the interior of the tub. The rear of the fixture includes an air inlet and a water inlet connected to plumbing which separately provides air and water supplies. The connections of the jet fixture to the plumbing is typically a serpentine collection of flexible conduits which each must be coupled between a manifold and the respective jet fixtures at the time of spa plumbing installation. The conventional method of installation is undesirable for several reasons. First, all connections between plumbing fixtures (air manifold, water manifold, and spa jet fixtures) are made at the time of installation. This requires a large number of connections to be made at the installation site in typically cramped working conditions. Moreover, it may be difficult to reach and accomplish the connection due to the location of a particular jet fixture. Second, each plumbing connection (at manifold side and water and air inlets) must be glued or clamped in position by a skilled worker. If the connection is glued, several steps must be performed: opening the glue container, using an applicator to remove glue from the container, applying the glue to the outside of an end of a conduit, closing the glue container, inserting the end of the conduit into a respective slip fitting in a plumbing fixture, and holding the conduit relative to the plumbing fixture until the glue sets to secure the connection. This process must be repeated for each glued connection and can be time consuming and exhausting, particularly at hard-to-reach connections. Also, gluing requires good ventilation and a respirator should be used to avoid inhaling the glue fumes. If the connection is clamped, special tools are required and it may be difficult to utilize the tools for tightening the clamp about the conduit in the space available. Third, with respect to both gluing and clamping, the conduit and plumbing fixture are rotatably fixed after coupling. Therefore, if it is afterward desirable to direct the conduit at a different angle from the plumbing fixture, e.g., due to apparent stress being provided to the conduit, it is not possible to redirect the conduit to remove the stress without disassembling the connection and adding additional plumbing fittings, e.g., 45° or 90° elbows, or a combination thereof, to direct the conduit toward the desired location.

U.S. Pat. No. 6,141,804 to Pinciaro discloses an improved system which facilitates the rapid and easy connection of the fixtures to plumbing for air and water supplies. The system includes a fluid line connector having a plurality of flanges which are adapted to snap-fit onto the back of a spa jet fixture body and provide a fluid-tight seal with the fixture body without any tools. The system offers a marked improvement over the conventional practice of gluing and clamping. Nevertheless, there are several aspects for which improvement is sought. First, multiple sizes of spa jet fixture bodies are often used in a single spa tub hydrotherapy system. Depending on the size of the spa jet fixture body, a fluid line connector dedicated to that size of spa jet fixture must be used. This requires that multiple sizes of the fluid line connector be on hand for an installation, as well as increased costs for the tooling of each size connector. Second, if disassembly of the system is required, it cannot be performed without breaking several of the flanges of a component, thereby rendering that component unusable. Third, if one or more of the flanges inadvertently breaks, the integrity of the coupling will be lost.

SUMMARY OF THE INVENTION

It is therefore an object of the invention to provide a hydrotherapy jet system having a hydrotherapy fixture which can be quickly and easily connected to air and water plumbing.

It is another object of the invention to provide a single size fluid connector which may be coupled to multiple sizes of spa jet fixture bodies.

It is also an object of the invention to provide a hydrotherapy jet system which requires no tools for installation in the factory or at the job site.

It is an additional object of the invention to provide a hydrotherapy jet system which permits radial adjustment of a conduit relative to an inlet on the spa fixture.

It is yet a further object of the invention to provide a hydrotherapy jet system in which the components form a fluid tight seal and are not subject to breakage.

It is still another object of the invention to provide a hydrotherapy spa jet system in which the plumbing components can easily be disassembled from the spa fixture without damaging any of the components.

It is yet another object of the invention to provide a hydrotherapy spa jet system in which the plumbing components can be disassembled from the spa fixture for repair without necessitating draining water from the spa tub.

It is yet an additional object of the invention to provide a hydrotherapy jet system having a plumbing fittings which quickly and easily connect to each other in a fluid-tight manner, are glueless, and which can then be rotated 360° relative to each other.

In accord with these objects which will be discussed in detail below, a hydrotherapy jet system is provided which generally includes a fixture body, a jet nozzle within the fixture body, and an air line connector coupled to the fixture body, and a water line connector coupled to the air line connector. In accord with one aspect of the invention, the air line connector is provided with structure adapted to couple about the outside of relatively small fixture bodies and about the inside of relatively large fixture bodies. As such, the air line connector is universal for multiple sizes of fixture bodies. The water line connector preferably couples to the rear of the air line connector. Preferably, the air and water line connectors may be rotated relative to the element to which each is coupled to facilitate assembly and plumbing.

According to another preferred aspect of the invention, couplings between the components; i.e., between the water line and air line connectors and between the air line connector and the fixture body, include several particular structural features. First, one component includes a small circumferential bead and the other component includes a small circumferential groove sized to receive the bead. The insertion of one component into the other causes a snap-fit interlocking of the bead in the groove and thus longitudinally locks the components together. While the components are longitudinally locked together, they may nevertheless be rotated relative to each other. Second, one component includes a circumferential channel, and an o-ring is provided in the channel. The o-ring is compressed when the components are longitudinally locked together to thereby ensure a fluid tight seal between the components.

According to yet another preferred aspect of the invention, the coupling portions of the components are complete tubular portions and do not include flanges. The materials from which the components are comprised have sufficient natural ability to deform to permit the bead on one component to move along the inner surface of another component and 'snap' into a corresponding groove. Moreover, the components may be disassembled from each other without damage to the components with the use of a disassembly tool. Furthermore, the disassembly tool operates in conjunction with the fixture body to create a seal that permits, if necessary, repair of the plumbing of the hydrotherapy jet system while the tub is filled with water. This saves substantial time (draining water from the tub and refilling the tub with water), and reduces service charges associated with the repair.

With the system of the invention, the ease and expediency with which a spa fixture body may be coupled to the appropriate plumbing at the installation site is improved. It will be appreciated that manifolds for water and air supply may be preassembled off-installation site, i.e., in the factory. The required number of appropriate diameter and length flexible conduits for the installation plumbing connections are assembled. The flexible conduits for the water manifold are secured to the second ends (those adapted for secure coupling to a flexible plumbing conduit) of water line connectors. Likewise, the flexible conduits for the air manifold are secured to second ends of air line connectors. With this project preferably completed at the factory, the invention permits installation at the assembly site to be greatly facilitated. The on-site installation process is substantially reduced in time and simplified, and no tools are required for the plumbing connections. Moreover, due to the universal nature of the air line connector, a fewer number of different components are required to be tooled for production and stored at the factory.

Additional objects and advantages of the invention will become apparent to those skilled in the art upon reference to the detailed description taken in conjunction with the provided figures.

BRIEF DESCRIPTION OF THE DRAWINGS

FIG. 5 is a longitudinal section view of a venturi element according to the second embodiment of the invention;

FIG. 6 is a section view of a bushing element according to the second embodiment of the invention;

FIG. 7 is a section view of a rim element according to the second embodiment of the invention;

FIG. 8 is a rear end view of a spin/pulse nozzle element according to the second embodiment of the invention;

FIG. 9 is a side elevation view of the spin/pulse nozzle element according to the second embodiment of the invention;

FIG. 10 is a front end view of the spin/pulse nozzle element according to the second embodiment of the invention;

DETAILED DESCRIPTION OF THE PREFERRED EMBODIMENTS

Figure 1:
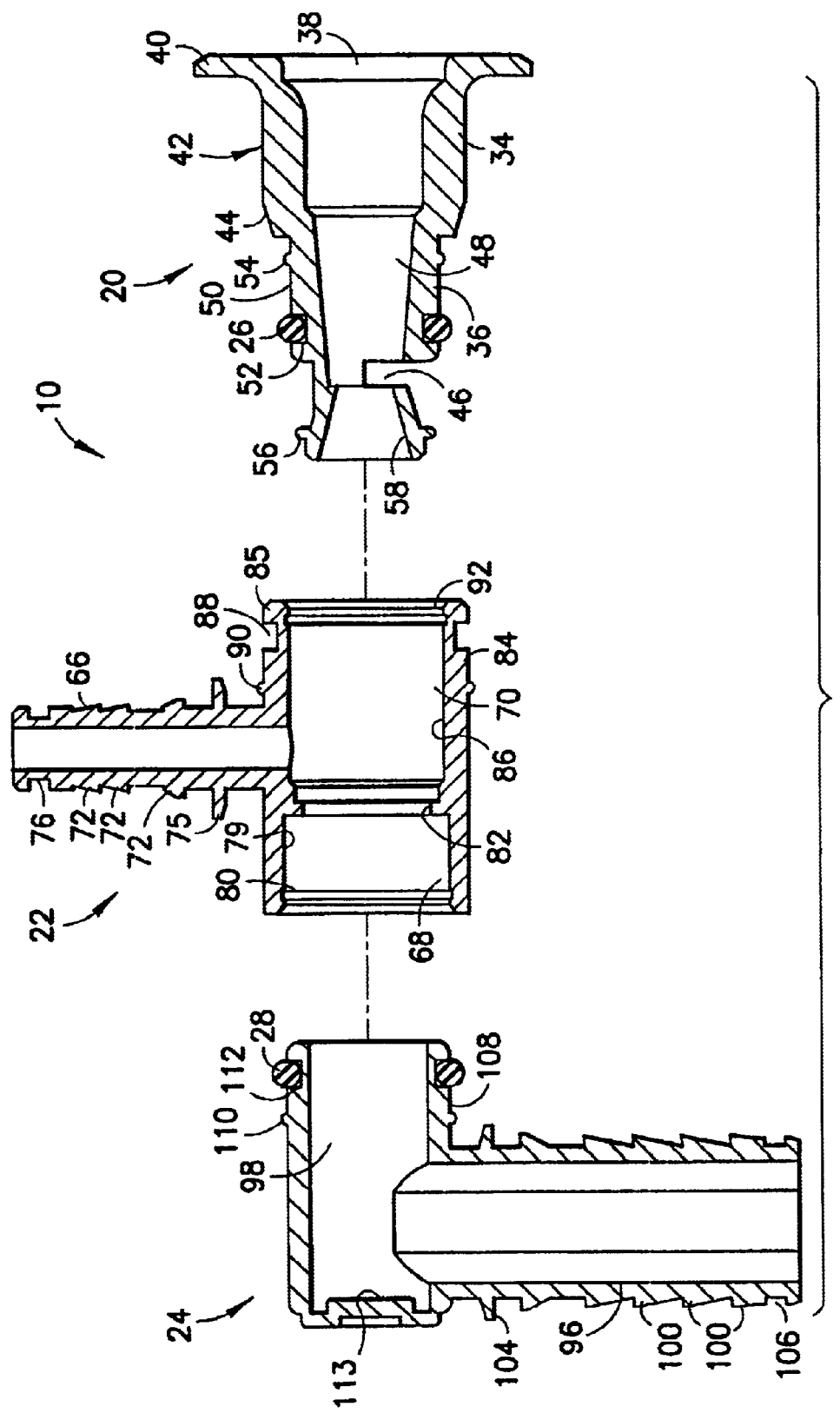
FIG. 1 is an exploded longitudinal section view of components of a hydrotherapy jet system according to a first embodiment of the invention.

Turning now to FIG. 1, a first preferred embodiment of a hydrotherapy jet system 10 generally includes a fixture body 20, a universal air line connector 22, a water line connector 24, and two o-rings 26, 28. The fixture body 20, air line connector 22, and water line connector 24 are all preferably made from schedule #40 or #80 PVC, although other materials having similar stiffness and resilience could be utilized for one or more of these elements.

The fixture body 20 is a tubular construct generally including a front portion 34 and a rear portion 36. The front portion 34 includes an opening 38 surrounded by a peripheral lip 40, and an outer surface 42 having a rear taper 44. The rear portion 36 defines an air inlet 46 leading to a throat 48, an outer surface 50 provided with a circumferential channel 52 in which o-ring 26 is provided, a circumferential bead 54, and a outer lip 56. According to the preferred embodiment shown in FIG. 1, the air inlet 46 is preferably radially-oriented, and the rear portion 36 preferably also defines a venturi 58 rear of the air inlet 46. Alternatively, referring to FIG. 2, an axial inlet 46a may be provided to the rear portion 36, and a separate venturi component 58a may be provided and adapted to be positioned at the rear end of the fixture body 20.

Figure 2:
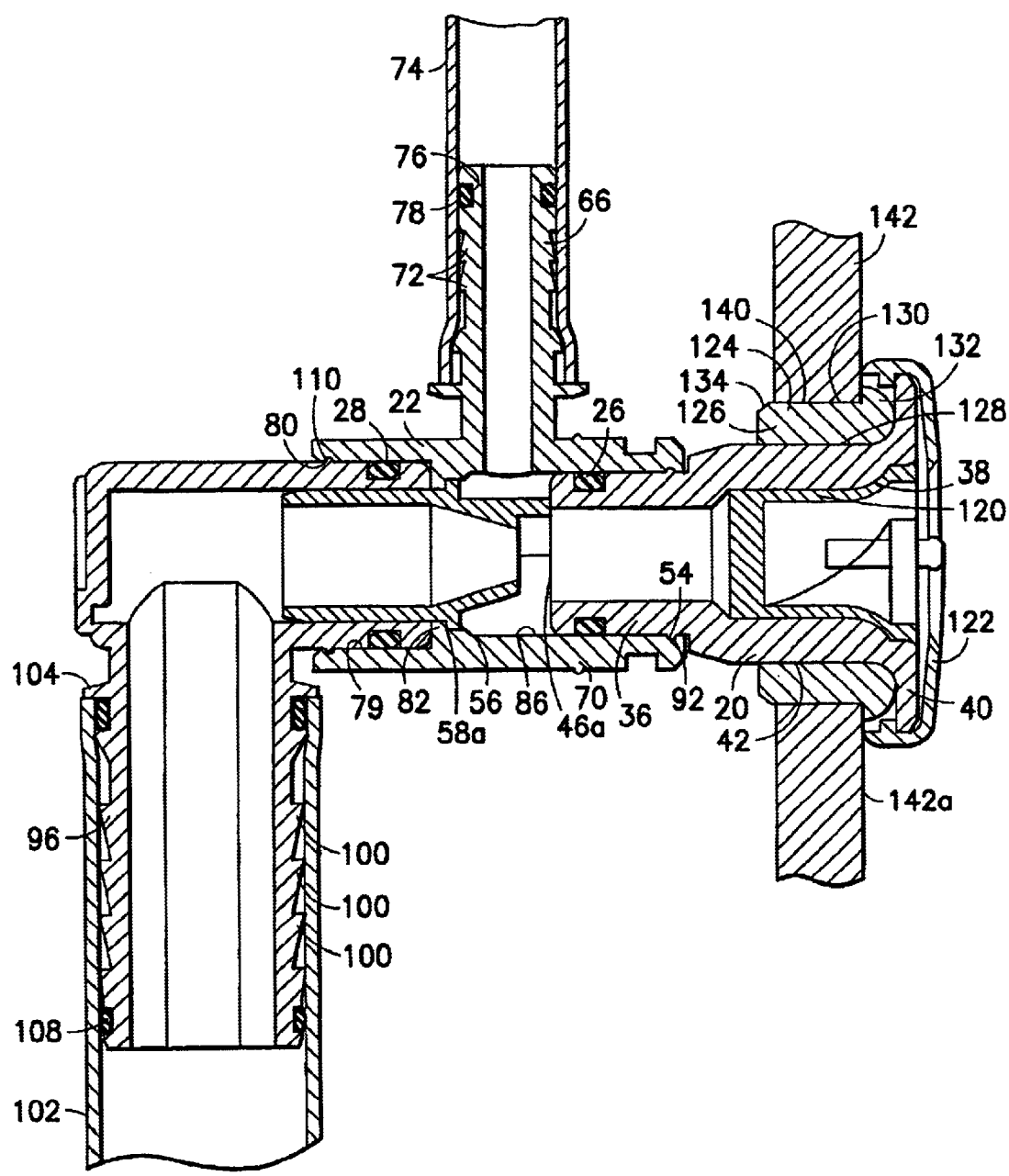
FIG. 2 is a longitudinal section assembly view of a hydrotherapy jet system according to the first embodiment of the invention.

Referring to FIGS. 1 and 2, the air line connector 22 includes three tubular sections in a preferably T-shaped configuration: a tubular air inlet 66, a water line connector coupling portion 68, and an outlet portion 70 preferably axially aligned with the water line coupling portion 68. The air inlet 66 has a plurality of barbs 72 for glued or clamped connection to a flexible air conduit 74, a stop 75 for the flexible air conduit 74, as well as a circumferential channel 76 for receiving an o-ring 78 that ensures a fluid tight seal with the flexible air conduit 74. The water line connector coupling portion 68 includes an inner surface 79 provided with a circumferential groove 80, as well as an internal ring 82 that functions as a stop for the water line connector 24. The outlet portion 70 includes an outer surface 84 having a slightly rounded or tapered end 85, and an inner surface 86. A circumferential channel 88 and a circumferential bead 90 are provided on the outer surface 84, and a circumferential groove 92 is provided about the inner surface 86. The channel 88 is preferably located between the bead 90 and the end 85.

The water line connector 24 is preferably an L-shaped tubular construct having an inlet portion 96 and an outlet portion 98. The inlet portion 96 defines a plurality of barbs 100 for glued or clamped connection to a flexible water conduit 102, a stop 104 for the flexible water conduit 102, as well as a circumferential channel 106 that receives an o-ring 108 to ensure a fluid tight seal with the flexible water conduit 102. The outlet portion 98 includes an outer surface 108 having a circumferential bead 110 as well as a circumferential channel 112 in which o-ring 28 is positioned. The outlet portion 98 is sized to be received into the water line connector coupling portion 68 of the air line connector 22, as described in more detail below.

Referring to FIG. 2, the hydrotherapy assembly 10 more completely includes a nozzle 120 and an escutcheon 122. The nozzle 120 is adapted to be received in the opening 38 at the front portion 34 of the fixture body 20 and secured therein by the escutcheon 122.

In addition, the assembly may include a grommet 124 that facilitates installation of the hydrotherapy assembly 10 in a tub wall. The grommet 124 includes a body portion 126 having a central opening 128, an outer surface 130 provided with a rear bevel 134, and a front lip 132.

The hydrotherapy assembly 10 is preferably assembled as follows. Still referring to FIG. 2, a hole 140 is formed in a wall 142 of a spa tub, e.g., by cutting. The grommet 124 is preferably pushed through the tub wall hole 140 from the inside of the tub and forced therein until the lip 132 seats against the interior side 142a of the tub wall. The rear bevel 134 provided to the grommet facilitates insertion of the grommet 124 into the hole 140.

The jet fixture body 20 is then-inserted into the grommet 124 until the lip 40 of the fixture body seats substantially against the lip 132 of the grommet. Optionally, a small amount a lubricant, e.g., soapy water, is coated over the inner opening of the wall grommet to facilitate the insertion. The lubricant is chosen to be one that will not break down the material of the wall grommet or the jet fixture body. The outer diameter of the surface 42 of the front portion 34 of the fixture body 20 is sized relative to the diameter of the opening 128 of the grommet 124 such that when the fixture body is inserted into the grommet a secure fluid tight seal results.

The outlet portion 70 of the air line connector 22, preferably with flexible air conduit 74 attached, is connected over the rear portion 36 of the fixture body 20. The rear taper 44 of the rear portion 36 of the fixture body facilitates coupling the outlet portion 70 over the rear portion 36. The internal ring 82 of the air line connector 22 abuts against the outer lip 56 of the fixture body 20 and defines a stop for the assembly. In addition, the bead 54 of the fixture body 20 engages in the groove 92 of the outlet portion 70 of the air line connector, and the inner surface 86 of the outlet portion 70 of the air line connector compresses the o-ring 26 to effect a longitudinally-locked fluid tight seal between the air line connector and the fixture body. Nevertheless, it will be appreciated that the air line connector 22 may be forcibly moved against the frictional force created by the o-ring 26 to be rotated relative to the fixture body 20.

The water line connector 24, preferably with flexible water conduit 102 attached, is coupled within the water line connector coupling portion 68 of the air line connector 22. The internal ring 82 of the air line connector 22 abuts against the end of the outlet portion 98 of the water line connector 24, and the bead 110 of the water line connector 24 engages within the groove 80 on the air line connector. In addition, o-ring 28 is compressed by the inner surface 79 of the water line connection coupling portion 68. This effects a longitudinally-locked fluid tight seal between the water line connector 24 and the air line connector 22. While longitudinally locked together, it will be appreciated that the water and air line connectors 22, 24 may be forcibly moved against the frictional force created by the o-ring 28 to be rotated relative to each other.

It is appreciated that the assembly of the fixture body 20, the air line connector 22 and water line connector 24 may be made by hand, may be assisted by the use of a rubber mallet or another impact-absorbing device, or may be accomplished utilizing a device that automatically draws the elements together, e.g., a hydraulic or pneumatic compression or clamping device. In addition, the relatively small size of fixture body 110 and the relative size of the tub hole through which it is intended to be used permits the fixture body 20, the air line connector 22 and water line connector 24 to be preassembled off-site of the installation location, and then brought to the installation location and inserted into the tub hole.

Figure 3:
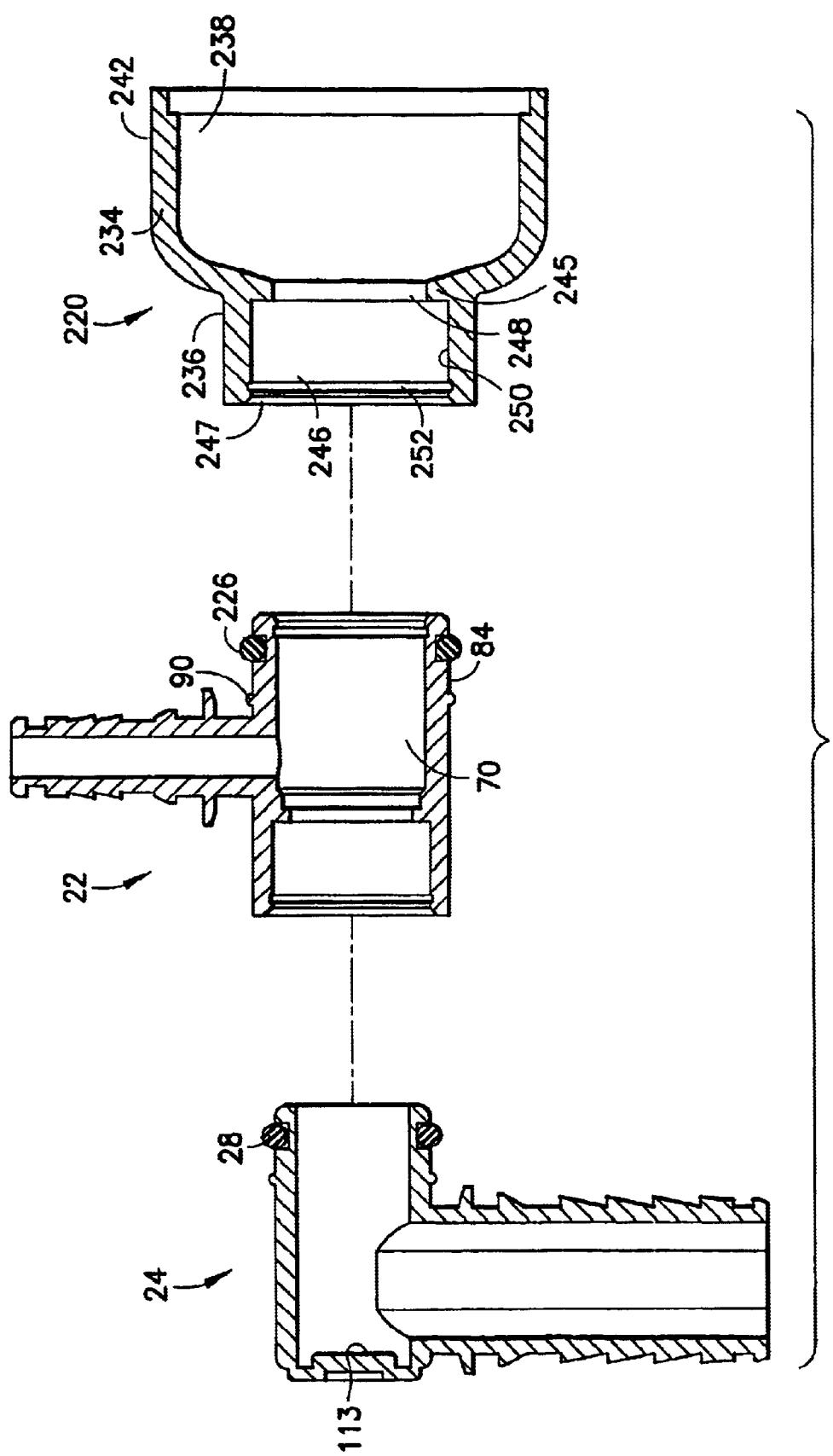
FIG. 3 is an exploded longitudinal section view of components of a hydrotherapy jet system according to a second embodiment of the invention.

Turning now to FIG. 3, a second preferred embodiment of a hydrotherapy jet system 210 according to the invention is shown. The system 210 includes a relatively larger fixture body 220 than that in the first embodiment, but the identical air line connector 22 and water line connector 24.

The fixture body 220 is a tubular construct generally including a front portion 234 and a rear portion 236. The front portion 234 includes a stepped opening 238 and an outer surface 242. The rear portion 236 defines an inlet 246 having a slightly flared entrance 247, an interior ridge 245 defining a throat 248, and an inner surface 250 provided with a circumferential groove 252. Comparing FIG. 1 with FIG. 3, it is seen that the rear portion 236 has substantially greater inner and outer diameters than the rear portion 36 of fixture body 20.

Figure 4:
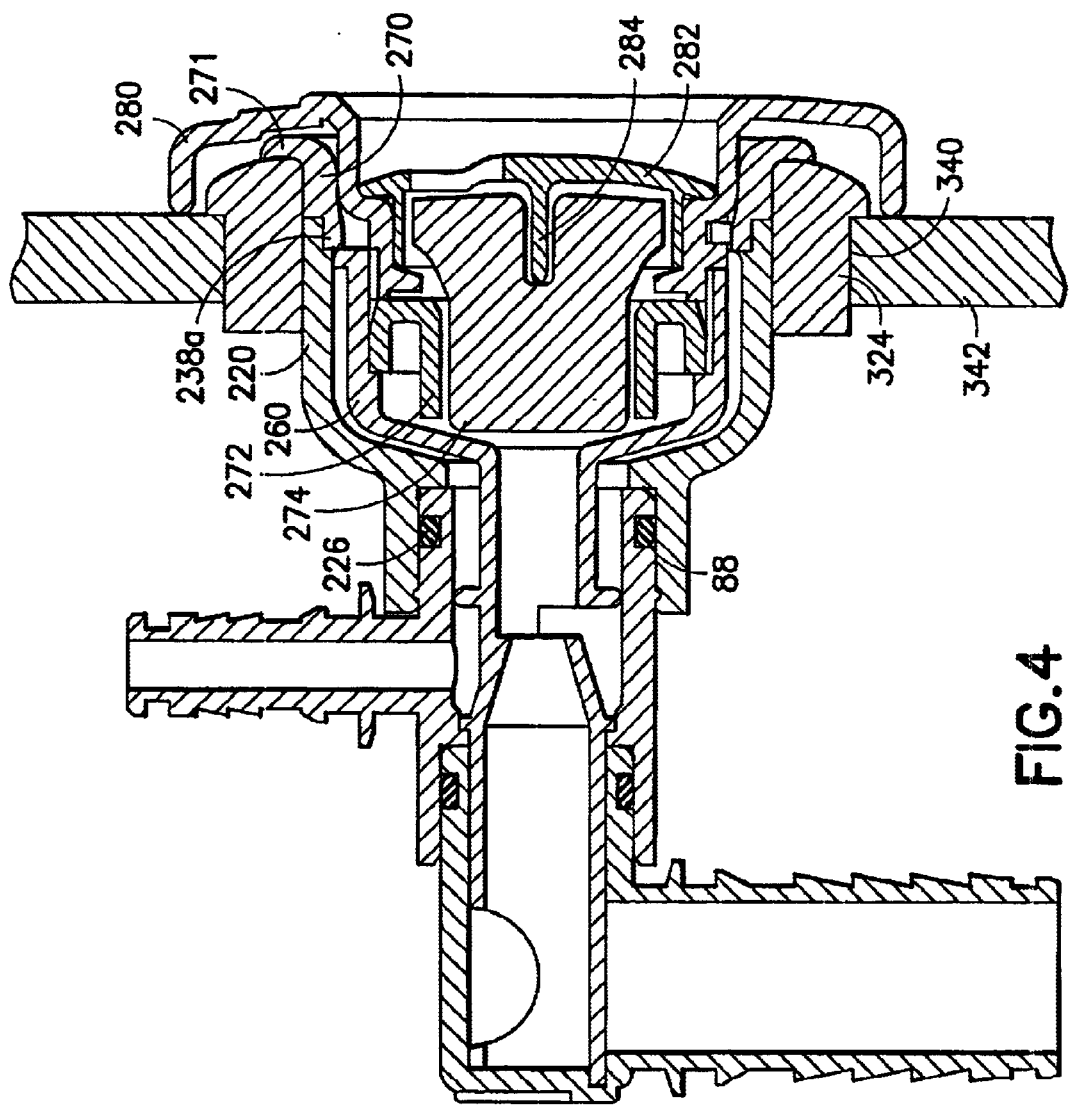
FIG. 4 is a longitudinal section assembly view of a hydrotherapy jet system according to the second embodiment of the invention.

Referring to FIG. 4, the fixture body 220 is provided with several spa jet elements. Referring to FIGS. 4 and 5, an elongate venturi element 260 is provided in the fixture body 220. The venturi element 260 includes a front receptacle 262 and a rear tubular portion 264 having a radially-located water inlet 266, an air inlet 268, and a venturi 269 therebetween. The venturi element 260 can have a venturi 269 with a diameter appropriate for a desired jet assembly, e.g., a diameter of 0.1875 inch, 0.25 inch, 0.3125 inch, or 0.375 inch. The venturi 269 is easily molded with a selected diameter by using a pin of appropriate diameter within the venturi element mold during manufacture. Referring to FIGS. 4 and 6, a rim element 270 defining a lip 271 is coupled within the step 238a of the fixture body 220, e.g, by gluing or snap fit, and operates to retain the venturi element 260, as well as provide a barrier to prevent pushing the fixture body through a grommet during assembly, as discussed below. Referring to FIGS. 4 and 7 through 10, a spin/pulse bushing 272 is provided in the receptacle 262 of the venturi element 260, and a spin/pulse nozzle 274 is provided in the bushing 272. The spin/pulse nozzle 274 includes two channels 276, each having a helically curved surface 278. When aerated water enters the channels 276 from behind, the nozzle is caused to spin. Referring to FIG. 4, an escutcheon 280 is provided over the rim 270 and traps the bushing 272 in the fixture body 220. A cap 282 is then provided at the center of the escutcheon 280. The cap 282 includes an axle portion 284 about which the nozzle 274 rotates. When the venturi element 260 is rotated in the fixture body 220, the water inlet 266 is moved in relation to the inlet portion 96 of the water line connector 24 to control the water pressure through the fixture body 220. It is recognized that various other spa jet elements, and particularly nozzle assemblies, known in the art can be provided within the fixture body.

Still referring to FIGS. 3 and 4, the second embodiment of the system is assembled as follows. As described above, a hole 340 is formed in a wall 342 of a spa tub, e.g., by cutting, and sized to accommodate a grommet 324 for the fixture 220, and a grommet 324 is pushed therethrough. The jet fixture body 20 is inserted into the grommet 324 until the lip 271 of the rim 270 seats substantially against the grommet 324. Two o-rings 226 and 28 are provided to assemble the fixture body 220, air line connector 22 and water line connector 24 in a fluid tight assembly. O-ring 226 is provided in the channel 88 on the outer surface 84 of the outlet portion 70 of the air line connector 22. The outlet portion 70 is then pushed into the rear portion 236 of the fixture body 220 until the outlet portion 70 abuts against the ridge 245 at the interior of the fixture body 220, the o-ring 226 is compressed against the interior surface 250 of the rear portion 236, and the bead 90 on the outer surface 84 of the outlet portion engages within the groove 252 on the inner surface 250 of the rear portion 236 of the fixture body 220. This effects a longitudinally-locked fluid tight seal between the air line connector 22 and the fixture body 220. The air line connector 22 may be forcibly moved against the frictional force created by the o-ring 226 to be rotated relative to the fixture body 220. The channel 88 is preferably located between the bead 90 and the end 85 of the outlet portion 70 so that the o-ring 226, provided in the channel 88, minimizes interference between the bead 90 and the inner surface of the fixture body 220 when the air line connector 22 and large fixture body 220 are coupled together.

The water line connector 24 is coupled within the air line connector 22, as discussed above with respect to the first embodiment.

Preferably after the air and water line connectors 22, 24 have been coupled with the fixture body 220, the venturi element 260, rim 270, and escutcheon 280 are coupled to the fixture body to complete the assembly.

From the above, it should be appreciated that the air line connector may be coupled to fixture bodies having different dimensions. This is because the fixture body, by having an interior surface with a groove and an exterior surface with a bead and channel adapted to receive an o-ring, is adapted to be coupled onto relatively small diameter fixture bodies and to be coupled into relatively large diameter fixture bodies. In addition, a common water line connector may also be used with any size fixture body as the water line connector is connected to the universal air line connector.

Figure 11:
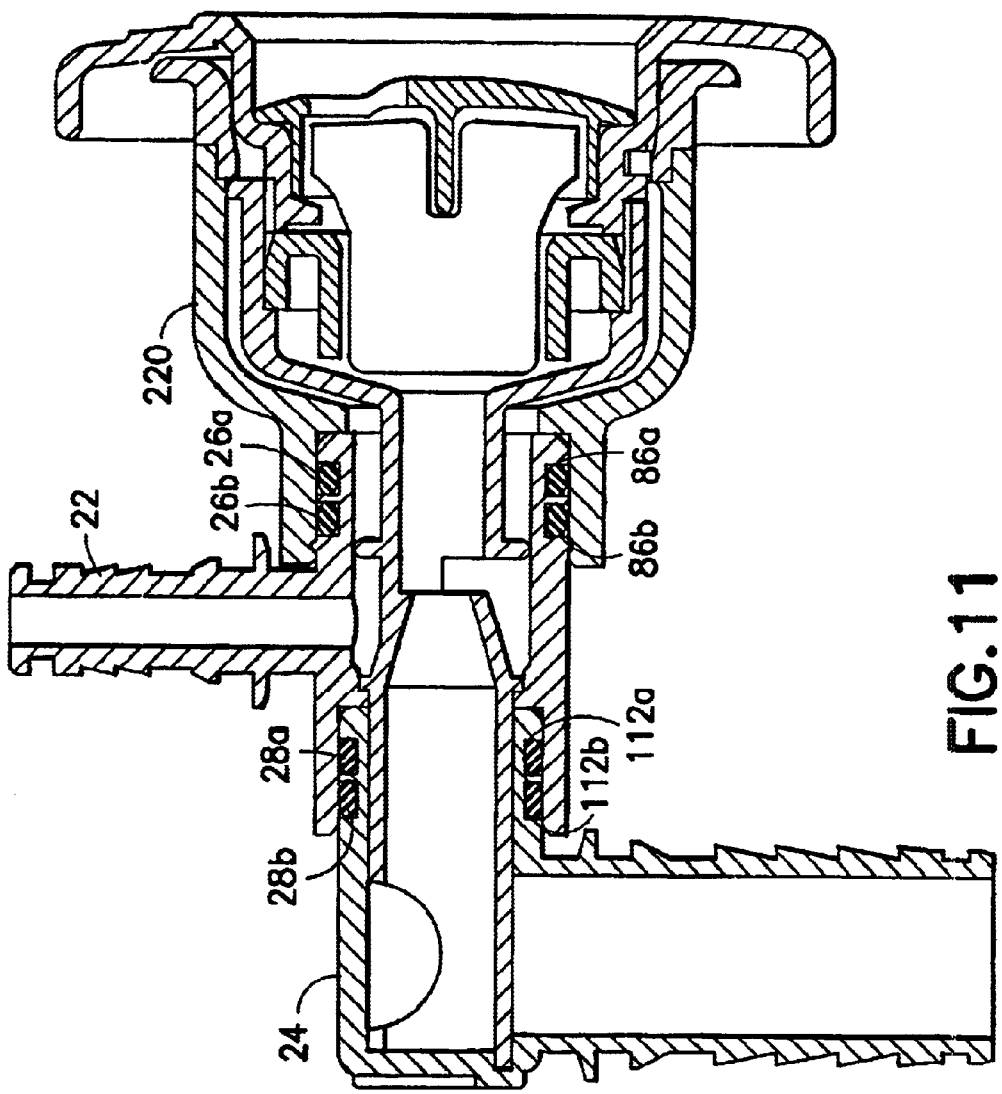
FIG. 11 is another embodiment of a fixture body according to the invention.

Referring to FIG. 11, according to an alternate embodiment of the invention, each of the fluid line connectors can be provided with two (or more) spaced-apart circumferential channels adapted to hold o-rings. As such, air line connector 22 includes o-ring channels 86a and 86b into which o-rings 26a and 26b are respectively provided. In addition, water line connector 24 includes o-ring channels 112a and 112b into which o-rings 28a and 28b are provided. O-rings 26a and 26b create the fluidtight seal between the air line connector 22 and the fixture body 220, and o-rings 112a and 112b create the fluidtight seal between the water line connector 24 and the air line connector 22. The double o-ring arrangement at each connection provides the security that should one o-ring fail, the other o-ring maintains the necessary fluidtight seal. This is a relatively low cost preventative solution compared to the repair and clean-up following the unexpected failure of a lone o-ring. It is understood that more than two o-rings (e.g., a triple o-ring arrangement) may also be used. Moreover, this multiple o-ring arrangement may also be used with the assembly 10 of the first embodiment.

According to a preferred aspect of the invention, it is noted that the coupling portions of the components are complete tubular portions; i.e., the components do not include resilient engagement flanges, such as described in U.S. Pat. No. 6,141,804. The materials from which the components are comprised have sufficient natural ability to deform to permit the bead on one component to move along the inner surface of another component and 'snap' into a corresponding groove, without necessitating flanges.

Figure 12:
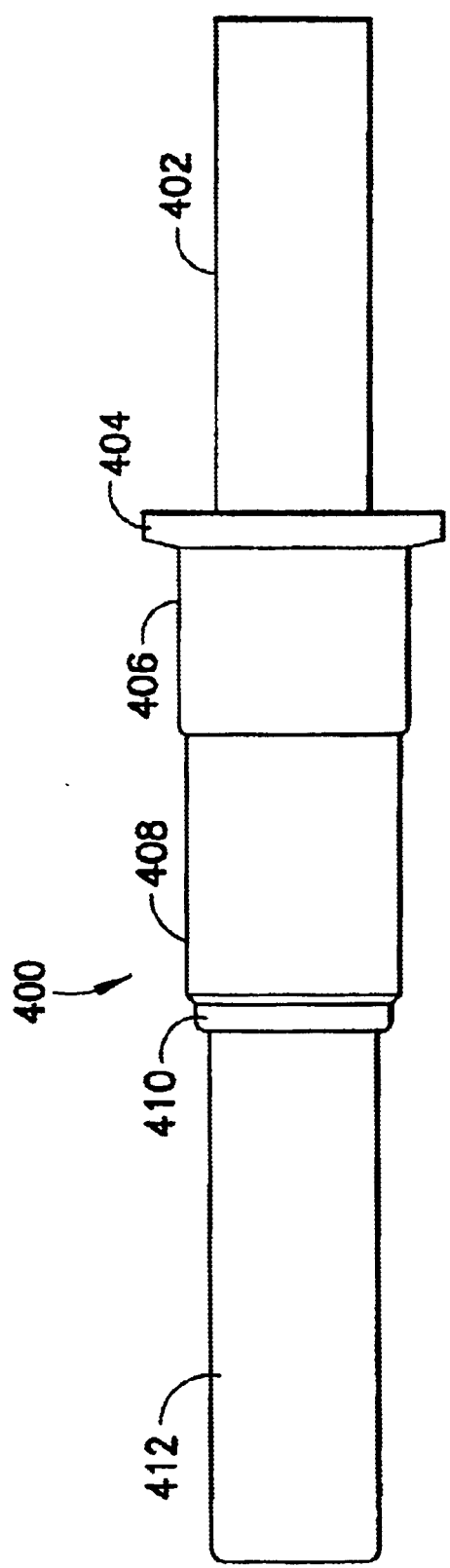
FIG. 12 is a side elevation of a disassembly tool according to the invention.
Figure 13:
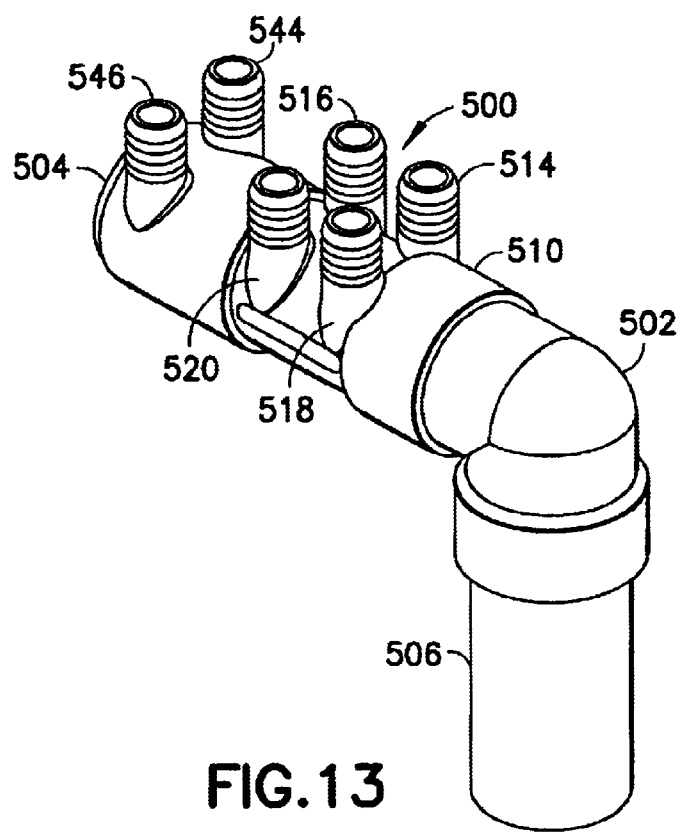
FIG. 13 is a perspective view of an assembly of plumbing components and fittings of a hydrotherapy jet system according to another embodiment of the invention.
Figure 14:
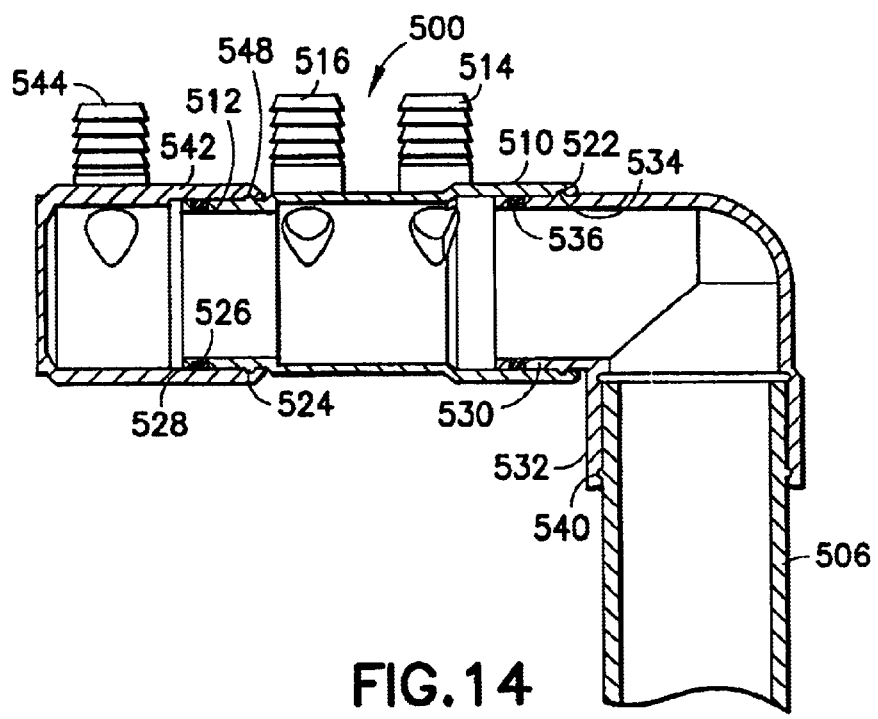
FIG. 14 is a longitudinal section view of the assembly of FIG. 13.
Figure 15:
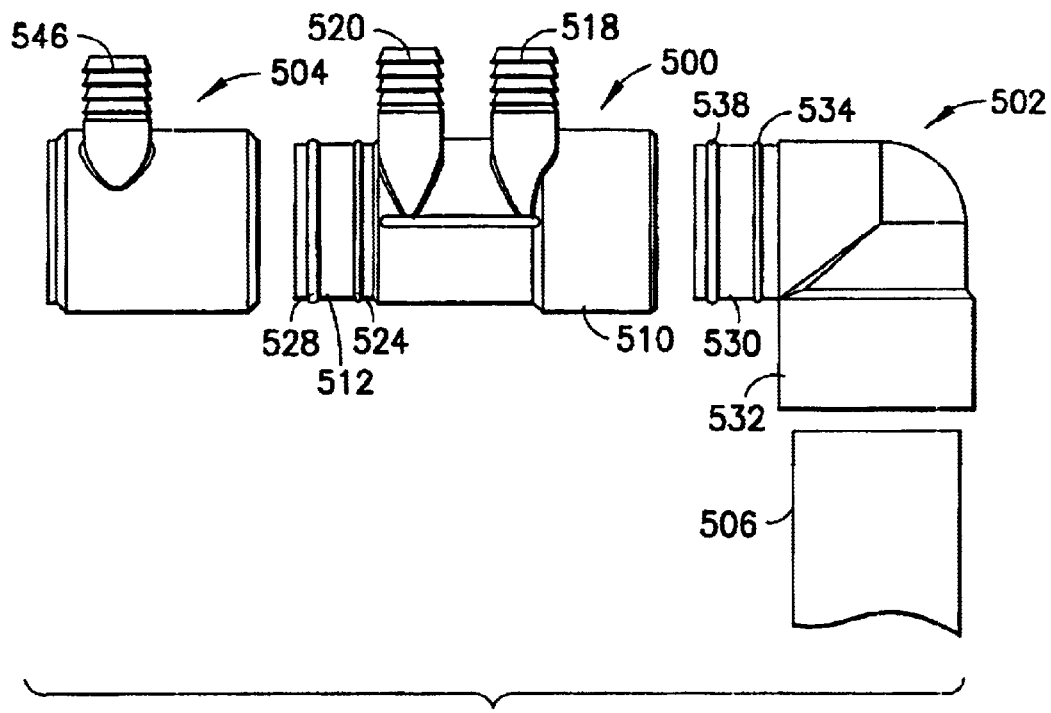
FIG. 15 is an exploded side elevation view of the assembly of FIG. 13.
Figure 16:
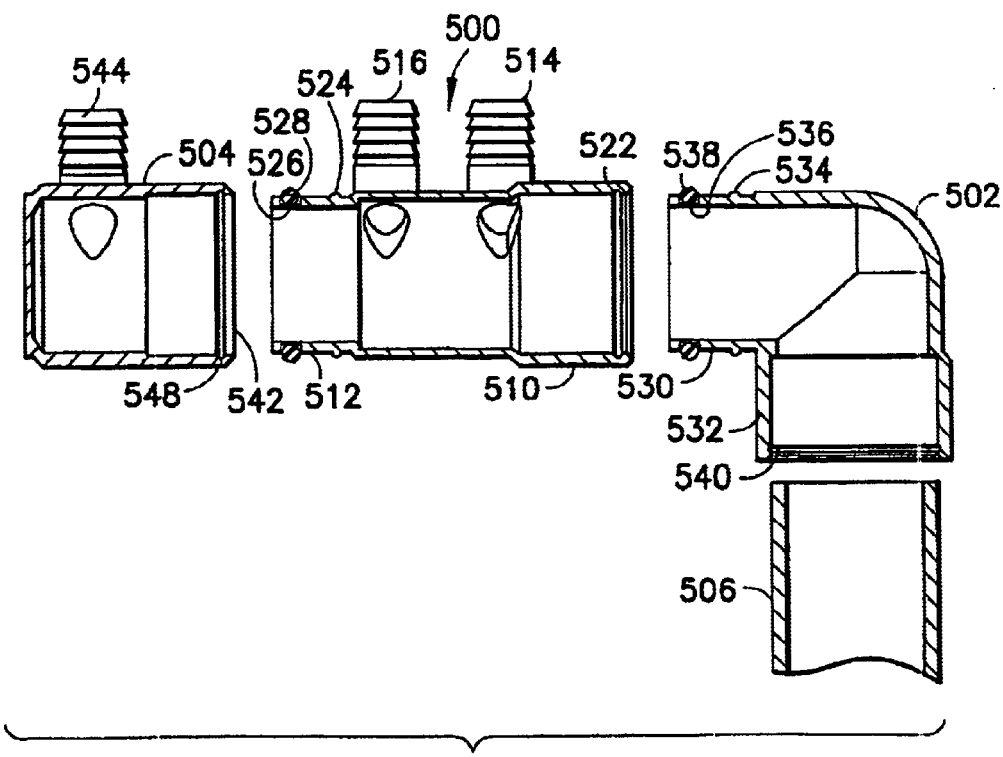
FIG. 16 is a longitudinal section view of the exploded assembly of FIG. 15.

As now described, the components may be disassembled from each other without damage to the components. Turning now to FIG. 12, in accord with the invention, a disassembly tool 400 is provided for disengaging air and water line connectors from a fixture body and preferably also for providing a watertight seal with the fixture body during disassembly. The tool shown is particularly adapted for use with fixture body 220, though a similar tool can be provided for fixture body 20. The tool 400 includes a handle portion 402, a rod-like portion having several sections 406, 408, 410 and 412 of progressively decreasing diameter, and a lip 404 therebetween. Sections 406, 408, 410, 412 together approximate a stretched-out internal profile of the assembled hydrotherapy spa jet system, including the air and water line connectors. If it is necessary to remove a line connector 20 from the fixture body 220, the spa jet elements (i.e., the cap, the escutcheon, the nozzle, the bushing, the rim, and the venturi element) are first removed from the opening of the fixture body. The tool 400 is then pushed into the opening 238 at the front portion 242 of the fixture body. The lip 404 is sized to prevent its movement through the throat 248 of the body 220 and adapted to create a watertight seal with the opening 238 when forced thereagainst. Section 408 has a diameter sized to extend within the outlet portion of the air line connector. In addition, section 412 has a diameter sized to extend within the outlet section 98 of the water line connector 24 and a length sufficient to permit it to contact a rear wall 113 thereof (FIG. 3). When the tool is subject to sufficient force at the handle end, e.g., upon the strike of a rubber mallet, the water line connector 24 is moved against the force of the bead and groove interlock and the frictional force of the o-ring to cause separation of the water line connector 24 from the air line connector 22. Once the water line connector 24 is removed, the tool may be moved further into the fixture body until section 410 seats against the internal ring 82 of the air line connector 22. The tool may again be subject to force to disengage the water line connector from the fixture body. As such, the fixture body can be relatively easily, quickly, and non-destructively disassembled from the air and water line connectors. As the tool can be forced into the fixture relatively quickly and as the lip 404 is adapted to create a watertight seal against the opening 238 of the fixture body when the tool is fully inserted, the disassembly and reassembly can be performed without draining water from the tub.

According to another embodiment of the invention, fluid line connectors are provided which are adapted to form glue-free and fluid-tight connections with fittings other than a fixture body. Referring now to FIGS. 13 through 16, in one exemplar embodiment, a four-port manifold 500 is coupled to a 90° elbow fitting 502 and a two-port terminal manifold 504. A pipe portion 506 is also shown coupled to the 90° elbow fitting 502.

The four-port manifold 500 has first and second ends 510, 512, and four ports 514, 516, 518, 520 located intermediate the ends. The first end 510 preferably has an internal diameter that corresponds in size to the outer diameter of the second end 512. The interior surface of the first end 510 is provided with a groove 522. The exterior of the second end 512 is formed with a bead 524 and a channel 526. An o-ring 528 is provided in the channel 526.

The elbow fitting 502 includes first and second ends 530, 532. The first end 530 of the elbow fitting 502 has an outer diameter that corresponds in size to the internal diameter of the first end 510 of the four-port manifold 500. The outer surface of the first end 530 includes a bead 534 and a channel 536. An o-ring 538 is provided in the channel 536. The second end 532 of the elbow fitting 502 preferably includes an internal groove 540.

The two-port manifold 504 includes an open-end 542 having an internal diameter corresponding to the size of the external diameter of the second end 512 of the four-port manifold 500, as well as two ports 544, 546. The open end 542 includes an interior surface provided with a groove 548.

The elements are coupled together substantially as discussed above with respect to the fixture body. That is, the first end 530 of the elbow fitting 502, with o-ring 538 in channel 536, is inserted into the first end 510 of the four-port manifold 500 until the bead 534 seats in the groove 522. This provides a glueless watertight seal that locks the fittings together yet permits 360° rotation of one fitting relative to the other. Likewise, the second end 512 of the manifold 500, with o-ring 526 provided in channel 528, is inserted into the open end 542 of the two-port manifold 504 until the bead 524 seats and locks within groove 548. Pipe portion 506 may be glued within the second end 532 of the elbow fitting 502. Alternatively, as the second end of the elbow fitting includes a groove 548, any fitting or pipe having a bead and a channel provided with an o-ring can be gluelessly coupled thereto in a watertight manner in accord with the invention. Moreover, numerous other fittings, including, but not limited to, 45° elbows, side outlet elbows, cross fittings, tee fittings, slips, plugs, caps, adapters, etc. can be adapted in this manner.

There have been described and illustrated herein hydrotherapy jet assembly systems and methods of installing the same. While several embodiments of the invention have been described, it is not intended that the invention be limited thereto, as it is intended that the invention be as broad in scope as the art will allow and that the specification be read likewise. Therefore, while an air line connector is described as being coupled to the fixture body, and a water line connector is described as being coupled to the air line connector, it is recognized that a water line connector may be coupled to the fixture body, and an air line connector may be coupled to the water line connector. In such an assembly, the water line connector preferably defines two concentric fluid pathways, one for water and one for air such that the air may be properly entrained into the water. Such concentric pathways are shown in a water line connector described U.S. Pat. No. 6,141,804, which is hereby incorporated by reference herein in its entirety. Also, while the components have been described as being preferably made from schedule #40 or #80 PVC, they may also be made from other appropriate materials, such as polyethylene, polypropylene, and ABS. In addition, while water and air connectors are described as radially extending relative to the axis of the fixture body, it will be appreciated that the water and air conduit connectors may be provided with different relative angles. Furthermore, the water and air inlets do not necessarily have to be barbed, as other means for connecting the water line connector and air line connector to water and air conduits can be used, e.g., various standard plumbing connections, other friction fittings, or glued connections. Moreover, o-rings are not required at the barbed ends of the water and air conduit connectors. Also, while particular fixture bodies have been described, it will be appreciated that the invention may be utilized with other designs of fixture bodies. For example, T-type fixture bodies which pass through water and air flow to a linear array of other bodies which are coupled together, may also be used. In addition, while the fixture body is shown as being secured in the hole in the tub wall with a grommet, it will be appreciated that other means may be used to secure the fixture body therein. For example, the fixture body may be adapted to threadably mate with a wall fitting such that the tub wall is sandwiched between the fixture body and the wall fitting. Furthermore, while beads and grooves are shown on respective components, it is recognized that wherever a bead is shown, a groove may alternately be provided, and wherever a groove is shown, a bead may alternately be provided. Moreover, while the outlet of the water line connector is shown as having a size adapted to be fit into the air line connector, it is recognized that a channel may be provided on the outer surface of the water line connector coupling portion of the air line connector, and that the water line connector can be coupled over the air line connector. Also, while it has been described that the air line connector is first connected to the fixture body, and the water line connector is then connected to the air line connector, it is understood that the water line connector may first be coupled to the air line connector and the assembly of the air and water line connectors may then be coupled to the fixture body. It will therefore be appreciated by those skilled in the art that yet other modifications could be made to the provided invention without deviating from its spirit and scope as claimed.

I claim:

1. A hydrotherapy spa jet system installable in a hole in a tub wall, said spa jet system comprising:
   a) a first fluid line connector including a first fluid inlet, a second fluid inlet, and a fluid outlet portion,
      said fluid outlet portion having an inner surface and an outer surface, said inner surface defining one of a first groove and a first bead, and said outer surface defining one of a second groove and a second bead; and
   b) a fixture body including a front portion and a rear portion, said front portion defining a nozzle opening, and said rear portion defining a tubular surface having one of an inner groove, an inner bead, an outer groove and an outer bead,
said rear portion of said fixture body adapted to be longitudinally coupled in a snap-fit interlock to said fluid outlet portion of said first fluid line connector such that said one of an inner groove, an inner bead, an outer groove and an outer bead of said fixture body is engaged with one of said first groove, said first bead, said second groove, and said second bead of said first fluid line connector.

2. A hydrotherapy spa jet system according to claim 1, wherein:
said outer surface defines the other of a second groove and a second bead.

3. A hydrotherapy spa jet system according to claim 1, wherein:
said outlet portion of said first fluid line connector is sized to extend over said rear portion of said fixture body.

4. A hydrotherapy spa jet system according to claim 3, further comprising:
an o-ring,
wherein said rear portion of said fixture body defines a circumferential channel in which said o-ring sits,
said o-ring adapted to be compressed between said outlet portion and said rear portion when said outlet portion is extended over said rear portion.

5. A hydrotherapy spa jet system according to claim 1, wherein:
said outlet portion of said first fluid line connector is sized to extend into said rear portion of said fixture body.

6. A hydrotherapy spa jet system according to claim 5, further comprising:
an o-ring,
wherein said tubular surface of said rear portion of said fixture body is an outer surface of said rear portion, said outer surface defines a channel, and said o-ring is provided in said channel,
said o-ring adapted to be compressed between said outlet portion and said rear portion when said outlet portion is positioned in said rear portion.

7. A hydrotherapy spa jet system according to claim 1, wherein:
said fluid outlet portion of said first fluid line connector and said rear portion of said fixture body are each a non-flanged tubular portion.

8. A hydrotherapy spa jet system according to claim 1, further comprising:
c) a hydrotherapy nozzle assembly provided in said nozzle opening of said front portion of said fixture body.

9. A hydrotherapy spa jet system according to claim 1, further comprising:
c) means for securing said fixture body in the hole in the tub wall.

10. A hydrotherapy spa jet system according to claim 1, wherein:
said first fluid connector and said fixture body are adapted to rotate relative to each other when said first fluid connector is longitudinally coupled to said fixture body.

11. A hydrotherapy spa jet system according to claim 1, wherein:
said second fluid inlet of said fluid line connector has either an inner surface or an outer surface that is provided with one of a circumferential third groove and a third bead.

12. A hydrotherapy spa jet system according to claim 11, further comprising:
c) a second fluid connector including a first portion having a fluid inlet, a second portion having a fluid outlet, said fluid outlet having an end, an inner surface, and an outer surface, at least one of said inner surface and said outer surface defining one of a fourth bead and a fourth groove,
wherein said one of said circumferential third groove and said third bead of said second fluid inlet of said fluid line connector is adapted to engage with said one of said fourth bead and said fourth groove of said fluid outlet of said second fluid connector.

13. A hydrotherapy spa jet system according to claim 12, wherein:
said outer surface of said fluid outlet of said second fluid line connector defines a fourth bead.

14. A hydrotherapy spa jet system according to claim 12, wherein:
said first fluid connector and said second fluid connector are adapted to rotate relative to each other when said second fluid connector is engaged with said first fluid connector.

15. A hydrotherapy spa jet system according to claim 12, further comprising:
an o-ring,
wherein said fluid outlet of said second fluid connector defines a channel and said o-ring is seated in said channel, said o-ring adapted to be compressed when said second fluid connector is engaged with said first fluid connector.

16. A hydrotherapy spa jet system according to claim 12, wherein:
said fluid outlet of said second portion of said second fluid line connector defines a non-flanged tubular portion.

17. A kit for a hydrotherapy spa jet system, comprising:
a) a first fluid line connector including a first fluid inlet and a fluid outlet portion,
said fluid outlet portion having an tubular portion defining an inner surface and an outer surface, said inner surface defining one of a first groove and a first bead and said outer surface defining one of a second groove and a second bead;
b) a fixture body including a rear tubular portion having an outer surface, and inner surface, and a front portion having an nozzle opening,
one of said outer surface and said inner surface of said rear portion including either a third bead or a third groove, and said fluid outlet portion of said first fluid line connector sized either to receive said rear tubular body or to be received within said rear tubular body such that said one of said first, second, and third beads is engageable in one of said first, second, and third grooves;
c) a hydrotherapy nozzle assembly adapted to be received in said nozzle opening of said fixture body; and
d) means for disassembling said first fluid line connector from said fixture body.

18. A kit according to claim 17, further comprising:
e) a second fluid line connector including a first portion having a fluid inlet and a second portion having a fluid outlet,
wherein said first fluid line connector includes a second fluid inlet, said second fluid outlet of said second fluid line being adapted to couple with said second fluid inlet of said first fluid line connector, and wherein said means for disassembling is further adapted to disassemble said second fluid line connector from said first fluid line connector.

19. A kit according to claim 17, wherein:

said means for disassembling includes a rod portion having a plurality of sections of successively decreasing diameter, a handle portion, and a lip between the rod and handle portions.

20. A hydrotherapy spa jet system installable in a hole in a tub wall, said spa jet system comprising:

a) a first fluid line connector including a first fluid inlet, a second fluid inlet, and a fluid outlet portion, said fluid outlet portion having an inner surface and an outer surface, said inner surface defining one of a first groove and a first bead, and said outer surface defining one of a second groove and a second bead; and b) a fixture body including a front portion and a rear portion, said front portion defining a nozzle opening, and said rear portion defining a tubular surface having one of an inner groove, an inner bead, an outer groove and an outer bead, said rear portion of said fixture body adapted to be longitudinally coupled to said fluid outlet portion of said first fluid line connector such that said one of an inner groove, an inner bead, an outer groove and an outer bead of said fixture body is engaged with one of said first groove, said first bead, said second groove, and said second bead of said first fluid line connector, and said first fluid connector and said fixture body are adapted to rotate relative to each other without loosening or tightening relative to each other.

\* \* \* \* \*